(12) United States Patent
Groll

(10) Patent No.: US 7,495,196 B2
(45) Date of Patent: Feb. 24, 2009

(54) FOOD COOKING OR WARMING APPARATUS WITH SELF-REGULATING INDUCTOR

(75) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 440 days.

(21) Appl. No.: 10/498,657

(22) PCT Filed: Dec. 13, 2002

(86) PCT No.: PCT/US02/40021

§ 371 (c)(1),
(2), (4) Date: Nov. 2, 2004

(87) PCT Pub. No.: WO03/053104

PCT Pub. Date: Jun. 26, 2003

(65) Prior Publication Data

US 2005/0045624 A1   Mar. 3, 2005

(51) Int. Cl.
*H05B 6/12* (2006.01)
*F24C 13/00* (2006.01)
(52) U.S. Cl. .......................................... 219/620; 126/5
(58) Field of Classification Search ................. 219/620, 219/621, 628, 623, 624, 627, 626; 99/451; 126/1, 2, 3, 4, 5
See application file for complete search history.

(56) References Cited

U.S. PATENT DOCUMENTS

| 3,530,499 A | 9/1970 | Schroeder |
| 5,134,265 A | 7/1992 | Dickens et al. |
| 5,227,597 A | 7/1993 | Dickens et al. |
| 5,597,500 A | 1/1997 | Hasenfratz et al. |
| 5,641,422 A * | 6/1997 | Matsen et al. ................ 219/633 |
| 5,665,263 A * | 9/1997 | Gaspard ..................... 219/625 |
| 5,756,973 A * | 5/1998 | Kirkwood et al. ........... 219/634 |
| 5,928,550 A | 7/1999 | Weiss |
| 6,214,401 B1 * | 4/2001 | Chaput et al. ................ 426/523 |

FOREIGN PATENT DOCUMENTS

| DE | 9005920 U | 8/1990 |
| FR | 2 527 916 A | 12/1983 |
| JP | 5533456 U | 8/1953 |
| JP | 63166119 U | 10/1988 |
| JP | 5-283154 A | 10/1993 |
| JP | 5329053 A | 12/1993 |

* cited by examiner

*Primary Examiner*—Daniel L Robinson
(74) *Attorney, Agent, or Firm*—The Webb Law Firm

(57) ABSTRACT

A food cooking or warming apparatus (10) has a water-containing vessel (12) with an inductor portion for heating the water by way of a portable induction heating unit. The inductor portion (20) is made from a selected Ni—Fe alloy having a predetermined Curie temperature for maintaining the water temperature in the food warming apparatus between about 180°-200° F. (82°-99° C.).

2 Claims, 1 Drawing Sheet

FOOD COOKING OR WARMING APPARATUS WITH SELF-REGULATING INDUCTOR

BACKGROUND OF THE INVENTION

1. Field of the Invention

The present invention relates generally to cookware and, more particularly, to induction cookware having an inductor layer with a predetermined Curie temperature. Still more particularly, one embodiment of the present invention relates to food warming apparatus, trays and/or chafing dishes containing an inductor portion or layer with a Curie temperature approaching the boiling point of water. The present invention is also directed generally to induction cookware apparatus for cooking at a predetermined temperature range such as, for example, a popcorn maker, waffle maker, fondue pot, rice cooker and the like.

2. Description of Related Art

Induction cookware is generally well-known in the art for use on an induction cooking stove. This cookware has a ferromagnetic inductor bottom generally of a carbon steel or ferritic stainless steel and the induction stove or range has induction coils to cause heating in the inductor. Temperature is regulated much like a conventional natural gas or electric range by regulating the electric power input of the induction cooking unit.

In the food service industry, it is well-known to use warming trays, tables or chafing dishes to keep the food at an acceptably high temperature prior to and during serving. These food warming utensils, hereinafter sometimes referred to as "chafing dishes", commonly employ a water-containing vessel situated beneath the food holding vessel. A heat source in the form of an electrical heater, gas flame, or sterno or the like is positioned beneath the water-containing vessel to heat the water. The heated water then ideally supplies a sufficient amount of heat to the food contained in the upper vessel during the food serving period so as to enhance the dining experience.

It is, however, common that too little heat may be supplied to the water-containing vessel, in which case the food is not heated properly. On the other hand, if too much heat is supplied, the water in the lower vessel will boil, causing the water to dissipate, which requires periodic replenishment. The boiling water also generates steam. The steam rises and condenses in the upper food-containing vessel, causing the food to become soggy and otherwise less attractive and/or less palatable.

Chafing dishes and similar prior art devices which operate at a single optimal temperature are typically heated by contact resistance elements. These are controlled by contact thermostats and are equipped with over-temperature switches. An example of a resistance heated chafing dish is disclosed in U.S. Pat. No. 5,597,500 to Hasenfratz et al., which is incorporated by reference herein. Listed below are some distinct advantages which the self-regulating induction concept offers over both resistance and traditional induction heat:

(1) Induction is a faster method of heating a vessel than resistance. Resistance must conduct energy across a mechanical attachment. Induction preferably uses the vessel as the heating element.

(2) Induction is a more evenly distributed heat source. Since the magnetic flux is as wide as the drive coil, energy is evenly dispersed. Resistance heat must often be buffered with a thick conductor, making it slow and inefficient.

(3) Because the induction drive heats only the cooking vessel, it is more energy efficient than resistance.

(4) Resistance elements must be mechanically attached to the vessel, making them difficult to remove for cleaning. The induction vessel can be held in the appliance by conventional means, which can make it easily removable for cleaning.

(5) Self-regulating induction allows the construction of the appliance to be simple and cost effective. Temperature control is inherent to the alloy of the inductor. Hence, there is no need for costly thermal feedback controls and no possibility of overheating or underheating. The induction drive is less complicated and less costly, more compact and easier to use with the appliance than traditional heating units.

A commercial-style flat griddle having a plurality of griddle plates of different Curie temperatures is disclosed in U.S. Pat. No. 5,134,265 and a popcorn popper having an induction heated kettle is disclosed in U.S. Pat. No. 5,928,550, both of which are incorporated by reference herein. Induction heating cookware is disclosed in French Patent No. 2,527,916 wherein several pots and pans are provided with a magnetic stainless steel plate at the bottom which are said to have different Curie temperatures to produce different cooking temperatures for each utensil.

The present invention solves the problems encountered in the prior art by providing a vessel for cooking at a specified temperature wherein the bottom or a portion of the bottom of the vessel is made from a ferromagnetic Ni—Fe alloy material having a well-defined Curie temperature in the narrow temperature range desired for the desired cooking or heating application required. The vessel having a bottom portion of a specific Ni—Fe alloy composition for providing a Curie temperature in a desired range is combined with an induction heating unit to form a self-contained, unitary appliance for cooking or heating a particular food or foods such as, for example, a self-contained popcorn popper, a waffle iron, a fondue pot, a rice cooker, deep frier, a chafing dish or like appliances.

SUMMARY OF THE INVENTION

The present invention is directed to an appliance for cooking or heating at a predetermined temperature range. One presently preferred embodiment of the invention is in the form of a food warning apparatus, such as a chafing dish. In this embodiment, the invention features the use of induction heat to heat the water in a warming vessel to a temperature less than the boiling point of water. The bottom of the water-containing vessel is made from or has attached thereto a layer of metal having a Curie temperature of between about 180°-210° F. (82°-99° C.). The cooking vessel heats up to the desired temperature by means of magnetic flux which induces heat in the magnetic inductor layer. The inductor layer metal has a Curie temperature which is optimal for the vessel in question, and in the case of a chafing dish the inductor has a Curie temperature for heating the water close to but not at the boiling point, i.e., less than 212° F. (100° C.). When the inductor achieves the optimal temperature it undergoes a solid-to-solid phase change transformation which causes the inductor to become nonmagnetic. This causes the induction heating process to stop as if the induction vessel, i.e., the water-containing vessel, had been removed from the source of heating. The temperature at which this phenomenon occurs is a result of the alloy composition of the inductor material. Alloys of nickel and iron are particularly useful as Curie temperature control inductors. As the inductor cools, the phase change reverses and the material once again becomes magnetic. At this point, induction heating resumes. The magnetic/nonmagnetic cycling allows the cooking vessel to maintain the water temperature in the case of a chafing dish within a desired range of 180°-210° F. (82°-99° C.). An example of a presently preferred Ni—Fe alloy for this application is one containing about 22% Ni, balance Fe and other minor additions (such as Zn) (hereinafter collectively referred to as a "Ni—Fe alloy"), which has a Curie temperature of about 180°-200° F. (82°-93° C.), thus, is suitable for a chafing dish. A commercially available metal powder of a Ni—Fe—Zn composition suitable for use in the chafing dish of the present invention is identified as "NP22D" from Hitachi Metals America. The powder may be processed in a conventional manner by pressing, sintering, etc., to produce a wrought disk or sheet, or mixed with a polymer to form an unwrought disk or sheet.

Another example of a presently preferred Ni—Fe alloy for use in a popcorn popper is an alloy containing 34% Ni, balance Fe which possesses a Curie temperature of about 480°-500° F. (250°-260° C.), which is suitable for processing popcorn.

DETAILED DESCRIPTION OF THE INVENTION

EXAMPLE I

Figure 1:
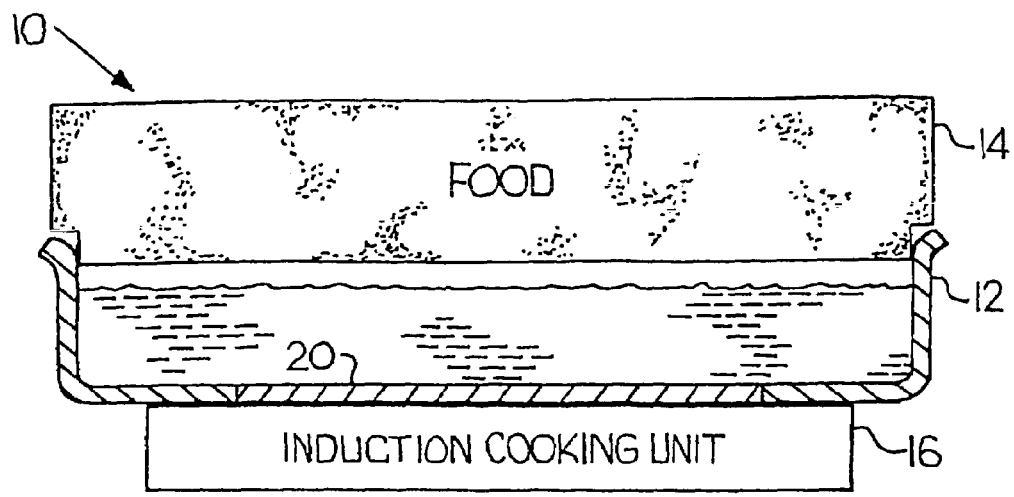
FIG. 1 is a schematic, cross-sectional side view of a food warming apparatus according to the present invention.

A food warming apparatus or chafing dish 10 according to the present invention is schematically depicted in FIG. 1. The chafing dish 10 includes a food-containing tray 14 which sits on a water-containing, warming vessel 12 which, in turn, rests on or is adjacent to a portable induction cooking device 16. The food-containing vessel 14 usually has a lid (not shown) to help contain the heat therein when the food is not being served. As shown in FIG. 1, the bottom of the water-containing vessel 12 has an inductor portion or disk 20 made from a selected metal alloy sheet or disk of Fe—Ni having a Curie temperature between about 180° F. (82° C.) to about 200° F. (93° C.) or up to no higher than the boiling point of water, i.e., 212° F. (100° C.). A presently preferred Ni—Fe alloy having a Curie temperature suitable for the chafing dish is an alloy containing 22% Ni, balance Fe, with minor amounts of Zn. The balance of the water-containing vessel 12 may be made from stainless steel in a conventional configuration. In the embodiment of FIG. 1, the vessel 12 is made in a conventional manner, for example, as by deep drawing a stainless steel sheet. An area of the bottom of vessel 12 is then punched out and the inductor portion or disk 20 is fitted in the open punched-out area and secured therein by brazing or welding. An inductor disk 20 may be on the order of about 6" in diameter, for example.

Figure 2:
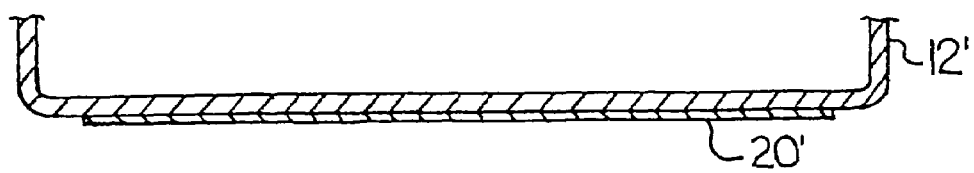
FIG. 2 is a fragmented, cross-sectional view of a further embodiment of a bottom portion of a water-containing vessel made in accordance with the invention.

Alternatively, as shown in FIG. 2, the water-containing vessel 12' may be formed, entirely of stainless steel and a separate sheet or disk 20' of the selected Curie temperature Fe—Ni alloy is bonded to the stainless steel bottom of vessel 12' as by brazing, welding, impact bonding or the like.

Power is applied to the portable induction cooking device 16 and the disk or sheet forming inductor portion 20 or 20' heats to its Curie point, between preferably 180°-200° F. (82°-93° C.). The water contained in vessel 12 is, thus, heated and the heat is transferred to the food-containing vessel 14. Once the Curie temperature is reached, the metal alloy of the inductor portion 20, 20' transforms from magnetic to non-magnetic and the induction heating phenomenon halts. Hence, the temperature of the water in vessel 12 cannot boil due to the fact that the Curie temperature of the inductor portion is below 212° F. (100° C.). After the temperature of the alloy of the inductor portion 20, 20' cools to a level below its lower Curie temperature, i.e., 180° F. (82° C.), the inductor portion transforms from non-magnetic to magnetic and, once again, begins to heat, and the cycle of heating and cooling continues without the need for elaborate electrical controls.

Of course, other configurations and variations in the food warming apparatus 10 will readily occur to those skilled in the art. The invention is not limited to the shape of the food warming apparatus described above and, in this regard, it may be square, rectangular, round or the like in configuration. The inductor portion 20, 20' preferably contacts or is closely positioned relative to the water for more efficient heating thereof, but it may be spaced therefrom a small distance as in a double walled or nested vessel arrangement. Alternatively, the inductor portion may be formed from a mixture of a polymer and a metal powder of Fe—Ni—Zn, for example, which has a Curie temperature in the desired range. This type of inductor is in a non-wrought condition and would be secured to or otherwise positioned on the bottom wall of the water-containing vessel 12. A commercially available metal powder of a Ni—Fe—Zn composition suitable for use as the inductor in the chafing dish of the invention is identified as "NP22D" marketed by Hitachi Metals America.

In all of the various configurations, it is important in accordance width the intent of the invention to select a Ni—Fe alloy (plus other minor additions) which possesses a Curie temperature such that the food warming water is heated to a temperature approaching, but not reaching, the boiling point of the water. In this way, the food is maintained at a proper serving temperature-while avoiding unwanted steam generation.

EXAMPLE II

Figure 3:
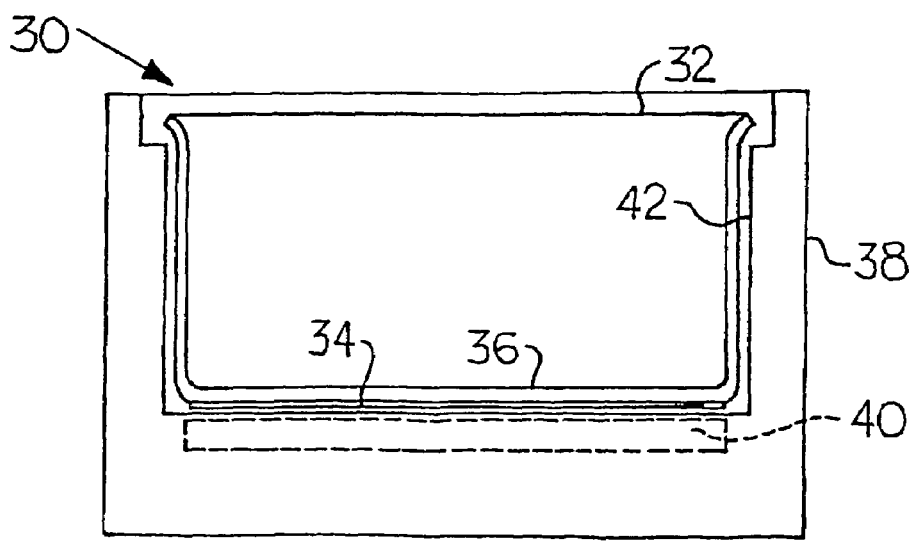
FIG. 3 is a schematic, cross-sectional side view of a unitary, self-contained popcorn popper apparatus according to the present invention.

A unitary, self-contained appliance 30 (depicted in FIG. 3) suitable for making popcorn has a cooking utensil 32 preferably made as a multi-layer composite having, for example, an inner layer on the food processing side made from an austenitic stainless steel such as a 304 stainless steel with a thickness of about 0.010 inch. A layer of Alclad® aluminum is roll bonded to the inner layer of stainless steel to provide even heat distribution to the inner layer. A disc 34 of 34% Ni, balance Fe alloy is brazed or impact bonded to the bottom 36 of the Alclad® aluminum layer to complete the construction. This Ni—Fe alloy provides a Curie temperature of between 480°-500° F. (249°-260° C.) which is suitable for popping corn. A housing 38 having an integral induction heating means 40 for generating an induction field is also part of the present invention. The housing 38 also has a cavity 42 for receivably supporting the cooking utensil 32 therein. A cover or lid (not shown) would also be provided to retain the popped corn within the unit 30.

I envision that cooking vessels can be made according to my invention to provide a specific desired vessel geometry coupled with a desired Curie temperature for cooking specific foods without underheating or overheating those specific foods. In addition to the popcorn maker discussed above, my present invention is suitable for the manufacture of a cheese pot or other fondue type appliance, a fish cooker, a waffle maker, a steak fryer and the like, to mention a few. The cooking vessel can be used in conjunction with a conventional induction cooking stove or with a unitary, self-contained, single coil induction cooking unit such as appliance 30 of FIG. 3. After use, the cooking utensil 32 of the invention is easy to clean because it can be removed from housing 38 and completely immersed in water, unlike conventional resistance heated appliances.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A food warming apparatus including a water-containing vessel and an inductor forming a portion of the bottom of the water-containing vessel or contacting the bottom of the water-containing vessel or in spaced proximity thereto; said inductor comprising a Ni—Fe alloy having a selected Curie temperature, selected via the Ni—Fe composition, whereby when said inductor is exposed to an induction heating unit, the inductor heats the water to a temperature approaching but not exceeding the boiling point of water while avoiding steam generation and the water is maintained at a temperature between 180-210 degrees F. (82-99 degrees C.).

2. A food warming apparatus comprising:
  (a) a tray for containing the food to be warmed;
  (b) a vessel for containing water and supporting said tray, said vessel having an inductor portion at a bottom wall made from a Ni—Fe alloy comprising about 22% Ni, balance substantially Fe and having a Curie temperature range of about 180°-210° F. (82°-99° C.) whereby, when said inductor portion is exposed to an induction field, the inductor portion heats the water in the vessel to the Curie temperature range to heat the food contained on said tray.

* * * * *